United States Patent [19]

Hirtle

[11] 4,205,370
[45] May 27, 1980

[54] TRACE METHOD AND APPARATUS FOR USE IN A DATA PROCESSING SYSTEM

[75] Inventor: Allen C. Hirtle, Needham, Mass.

[73] Assignee: Honeywell Information Systems Inc., Waltham, Mass.

[21] Appl. No.: 568,643

[22] Filed: Apr. 16, 1975

[51] Int. Cl.² .................. G06F 9/16; G06F 13/00
[52] U.S. Cl. ............................................ 364/200
[58] Field of Search ................. 340/172.5; 444/1; 364/200 MS File, 900 MS File, 300

[56] References Cited

U.S. PATENT DOCUMENTS

| | | | |
|---|---|---|---|
| 3,540,003 | 11/1970 | Murphy | 364/200 |
| 3,588,837 | 6/1971 | Rash et al. | 364/200 |
| 3,627,995 | 12/1971 | Warner, Jr. et al. | 364/200 X |
| 3,659,272 | 4/1972 | Trice et al. | 364/200 |
| 3,673,573 | 6/1972 | Smith | 364/200 |
| 3,675,214 | 7/1972 | Ellis et al. | 340/172.5 |
| 3,704,363 | 11/1972 | Salmassy et al. | 364/200 X |
| 3,707,725 | 12/1972 | Dellheim | 364/200 X |
| 3,748,650 | 7/1973 | Garcia et al. | 364/200 |
| 3,818,458 | 6/1974 | Deese | 364/200 |
| 3,868,644 | 2/1975 | Healey et al. | 340/172.5 |
| 3,935,563 | 1/1976 | Unger | 364/200 |
| 4,016,543 | 4/1977 | Franks et al. | 364/200 |
| 4,068,304 | 1/1978 | Beausoleil et al. | 364/200 |

*Primary Examiner*—Melvin B. Chapnick
*Attorney, Agent, or Firm*—Faith F. Driscoll; Ronald T. Reiling; Nicholas Prasinos

[57] ABSTRACT

A data processing system includes means which are operative when the system is conditioned for operating in a trace mode during the processing of program instructions, to record the op code of each instruction designated as executable by the bit contents of a table referenced before beginning instruction execution. When the op code of an instruction is designated by the table as not being executable, the system traps the instruction and generates a call to the operating system software without recording its op code. The selective recording and trapping of instruction operation codes facilitates diagnosis of program errors or faults within the system. This is particularly valuable when the system includes emulation apparatus which may not be completely compatible in every detail with the system being emulated.

23 Claims, 11 Drawing Figures

| RELATIVE LOCATION | ABBRV | CONTENTS 0 — 7\|8 — 15\|16 — 23\|24 — 31 | | | |
|---|---|---|---|---|---|
| | | CAPABILITY | PRIORITY | STATE | DEXT |
| 0* | PMW0 | XXXX0000 | XXXX0000 | XXXX0000 | 00000010 |
| 4 | PMW1 | ←— STATUS —→ | ←— MBZ —→ | ←— MP —→ | ←— MBZ —→ |
| 8 | PMW2 | TG \| RG | ←———————— SEG, SRA ————————→ | | |
| | | | | ←— EXCEPT CLASS —→ | ←— EXCEPT TYPE —→ |
| 12 | PMW3 | ←— DETSZ —→ | ←———— POINTER TO DECOR EXTENSION TABLE, DETA ————→ | | |
| 32 | ICW | TG \| RG | ←———————— SEG, SRA ————————→ | | |
| 52 | BR0 | TG \| RG | ←———————— SEG, OFFSET ————————→ | | |
| 56 | BR1 | TG \| RG | ←———————— SEG, OFFSET ————————→ | | |
| 60 | BR2 | TG \| RG | ←——— SEG, OFFSET (MAIN MEMORY) ———→ | | |
| 64 | BR3 | TG \| RG | ←——— SEG, OFFSET (CONTROL MEMORY) ———→ | | |
| 68 | BR4 | TG \| RG | ←——— SEG, OFFSET (I/O TABLES) ———→ | | |
| 72 | BR5 | TG \| RG | ←———————— SEG, OFFSET ————————→ | | |
| 76 | BR6 | TG \| RG | ←———————— SEG, OFFSET ————————→ | | |
| 80 | BR7 | TG \| RG | ←———————— SEG, OFFSET ————————→ | | |
| 84 | GR0 | ←— INV —→ | ←— INA —→ | ←— INB —→ | ←— INC —→ |
| 88 | GR1 | ←— MBZ —→ | ←———————— ADDRESS (70, BC) ————————→ | | |
| 92 | GR2 | ←— CONTROL —→ | ←———————— ADDRESS (67, AC) ————————→ | | |
| 96 | GR3 | ←— L —→ | ←———————— ADDRESS (77, SC) ————————→ | | |
| 100 | GR4 | ←— IND —→ | ←— INEI —→ | ←— RHU —→ | ←— MBZ —→ |
| 104 | GR5 | ←———————— CF WORK LOCATION (CFWL2) ————————→ | | | |
| 108 | GR6 | ←———————— CF WORK LOCATION (CFWL3) ————————→ | | | |
| 112 | GR7 | ←———————— CF WORK LOCATION (CFWL6) ————————→ | | | |
| 116 | GR8/IR0 | ←— MBZ —→ | ←———————— ADDRESS (64, CSR) ————————→ | | |
| 120 | GR9/IR1 | ←———————— CF CONTROL WORD (CFCW) ————————→ | | | |
| 124 | GR10/IR2 | ←— MBZ —→ | ←———————— ADDRESS (66, EIR) ————————→ | | |
| 128 | GR11/IR3 | ←— MBZ —→ | ←———————— ADDRESS (76, IIR) ————————→ | | |
| 132 | GR12/IR4 | ←———————— CF WORK LOCATION (CFWL1) ————————→ | | | |
| 136 | GR13/IR5 | ←— RSU —→ | ←— BRR —→ | ←— IBR (RBM) —→ | |
| 140 | GR14/IR6 | ←———————— CF WORK LOCATION (CFWL4) ————————→ | | | |
| 144 | GR15/IR7 | ←———————— CF WORK LOCATION (CFWL5) ————————→ | | | |
| 148 | SR0 | ←———————— SCIENTIFIC ACCUMULATOR 0 ————————→ | | | |
| 152 | SR0 | " " 0 | | | |
| 156 | SR1 | " " 1 | | | |
| 160 | SR1 | " " 1 | | | |
| 164 | SR2 | " " 2 | | | |
| 168 | SR2 | " " 2 | | | |
| 172 | SR3 | " " 3 | | | |
| 176 | SR3 | " " 3 | | | |

TG=TAG, RG=RING, MBZ= MUST BE ZERO, RSU=RESERVED FOR SOFTWARE USE, * = PCB ADDRESS

*Fig. 1b.*

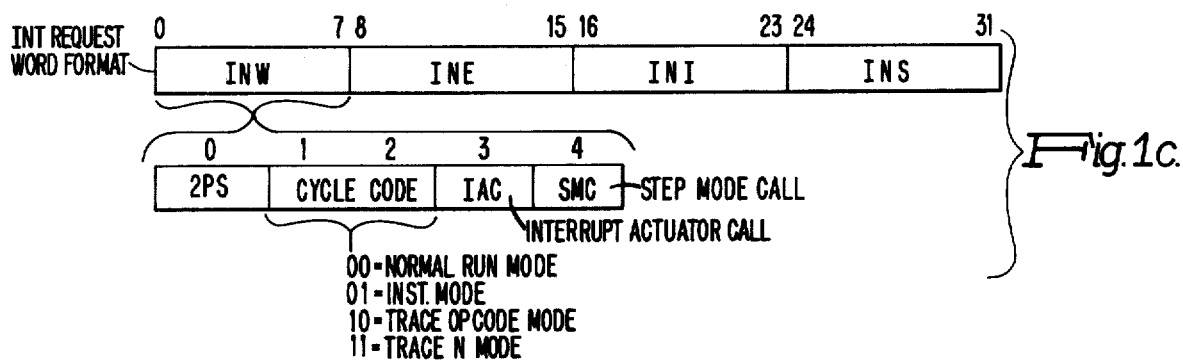
Fig. 1c.
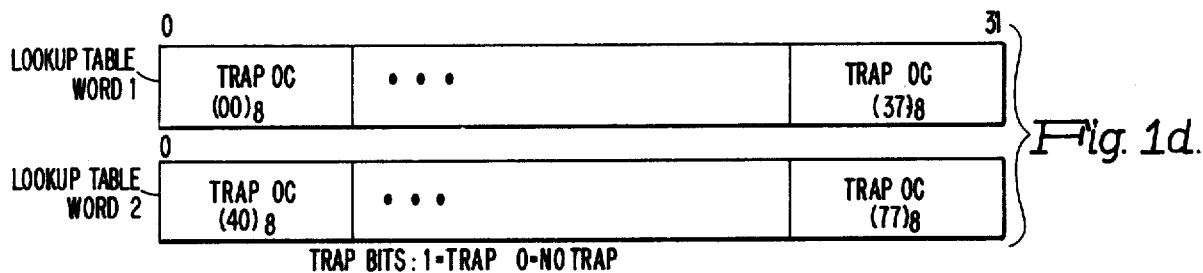
Fig. 1d.
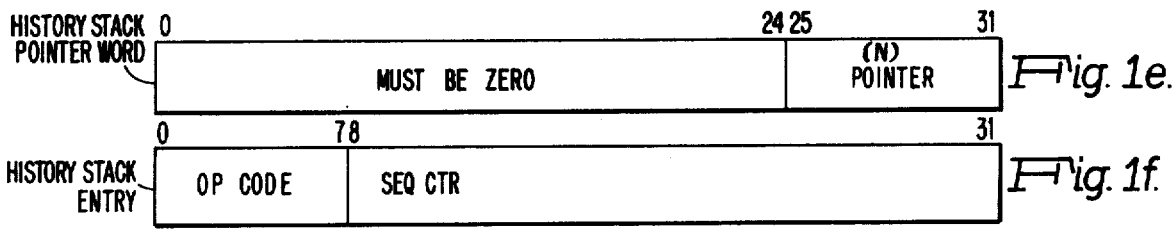
Fig. 1e.
Fig. 1f.

FORMAT OF CONTROL STORE WORD

| RD | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |

- Bits 0: RD
- Bits 1–7: CODING OF FIELD DEFINES THE SOURCE ON BUS A:
  - 00 = NO SOURCE OR SECONDARY UNITS ACCORDING TO BIT 8
  - 01 = SOURCE ON BUS A IS DEFINED BY ALU/EMU
  - 10 = SOURCE IS DEFINED BY ACU/DMU OR SPU
  - 11 = SOURCE IS DEFINED BY RCU
- Bits 8–15: MICROINSTRUCTIONS OF ACU/DMU AND SPU
- Bits 8–20: MICROINSTRUCTIONS OF EMU & ALU (5 BITS)
- Bits 21–24: COMPLEMENT CODE FOR RCU
- Bits 22–27: MICROINST. OF RCU & CONTROL STORE ADDRESSING (CSU)
- Bits 25–31: LONG ADDRESS OR LONG PARAMETER
- Bits 28–31: SHORT ADDRESS ARGUMENT FOR CSU NEXT ADDRESS-BRANCH

MICROINSTRUCTIONS OF EMU & ALU

| RD BIT POS. 8 | 9 | 10 | 11 | 12 | MICROINSTRUCTION EMU EM = 0 | MICROINSTRUCTION EMU EM = 1 |
|---|---|---|---|---|---|---|
| 1 | 1 | 1 | 1 | 1 | — | UNLD PL REG. (UPL) |
| 1 | 1 | 1 | 1 | 0 | LOAD AL REG. (LAL) | TX AL REG TO BUS A (TAL) |
| 1 | 1 | 1 | 0 | 1 | COMPUTE TBLE ADD FOR MIT/MAT (CTA1) | UNLD EMU CONDITIONS TO BUS A (UCN) |
| 1 | 1 | 1 | 0 | 0 | MODIFY PL REG. (MPL) | UNLD PL REG TO BUS A (UPL) |
| 1 | 1 | 0 | 1 | 1 | MODIFY AL REG. (MAL) | — |
| 1 | 1 | 0 | 1 | 0 | ADD INDEX REG. TO AL OR BL REG. | — |
| 1 | 1 | 0 | 0 | 1 | MODIFY BL REG. (MBL) | — |
| 1 | 1 | 0 | 0 | 0 | LOAD PROG. ADD REG. (LPL) | UNLD INDEX REG ADDRESS (UIX) |
| 1 | 0 | 1 | 1 | 1 | XFER AW TO AL REG. (TRA) | BRANCH (BNH) |
| 1 | 0 | 1 | 1 | 0 | — | SET CONDITIONS FOR EXTRACTION (SCT) |
| 1 | 0 | 1 | 0 | 1 | XFER AW TO BL REG. (TRB) | — |
| 1 | 0 | 1 | 0 | 0 | LOAD VR REG. (LVR) | — |
| 1 | 0 | 0 | 1 | 1 | LOAD INDEX/BARR REG. (LIB) | TX INDEX BARR. REG. (TIB) |
| 1 | 0 | 0 | 1 | 0 | COMPUTE BASE OF TBL FOR MIT/MAT (CBT) | — |
| 1 | 0 | 0 | 0 | 1 | LOAD BASE REL REG. (LBR) | TX BASE REL REG. (TBR) |
| 1 | 0 | 0 | 0 | 0 | LOAD AW REG. (A OPERAND) (LAW) | — |
| 0 | 1 | 1 | 1 | 1 | — | UNLD OR & EMB TO BUS A (UOR) |
| 0 | 1 | 1 | 1 | 0 | COMPUTE RESULT SIGN (CRS) | SINGLE BYTE OPERATION (SBO) |
| 0 | 1 | 1 | 0 | 1 | LOAD OP-CODE REG. (LOR) | SET EXECUTION CONDITIONS (SEC) |
| 0 | 1 | 1 | 0 | 0 | LOAD AW & BW REG. (ABW) | UNLD BW REG TO BUS A (UBW) |
| 0 | 1 | 0 | 1 | 1 | — | — |
| 0 | 1 | 0 | 1 | 0 | LOAD BW REG. (B OPERAND) (LBW) | LOAD AW REG TO BW REG. (ATB) |
| 0 | 1 | 0 | 0 | 1 | INITIALIZE EMULATOR (INZ) | UNLD AW REG TO BUS A (UAW) |
| 0 | 1 | 0 | 0 | 0 | LOAD EMULATOR BASE REG. (LEB) | UNLD WRITE MASK TO BUS A (UMS) |
| 0 | 0 | 1 | 1 | 1 | LOAD SENSE SWITCH REG. (LSS) | — |
| 0 | 0 | 1 | 1 | 0 | MULTIPLY OR DIVIDE (MAD) | RESULT BYTE ZERO (RBZ) |
| 0 | 0 | 1 | 0 | 1 | LOAD FUNCTION REG. (FR1 AND FR2)(LFR) | UNLOAD FR AND IR (UFI) |
| 0 | 0 | 1 | 0 | 0 | LOAD OPTION MASK REG. (LOM) | — |
| 0 | 0 | 0 | 1 | 1 | LOAD VARIANT AND INDICATORS (LVI) | — |
| 0 | 0 | 0 | 1 | 0 | LOAD BL REG. TO BW REG. (BLW) | — |
| 0 | 0 | 0 | 0 | 1 | BLANK | |
| 0 | 0 | 0 | 0 | 0 | | |

Fig. 2.

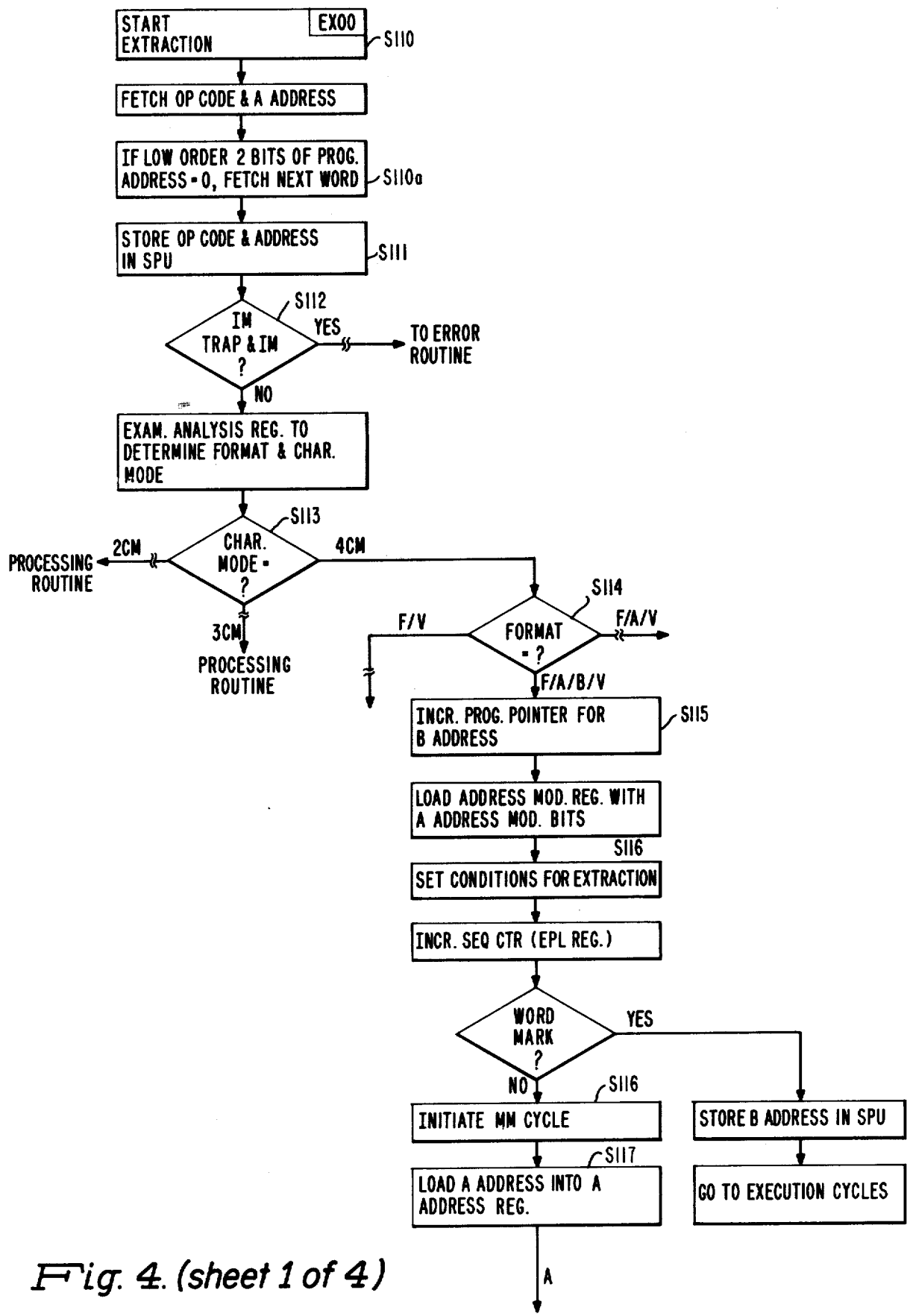
Fig. 4. (sheet 1 of 4)

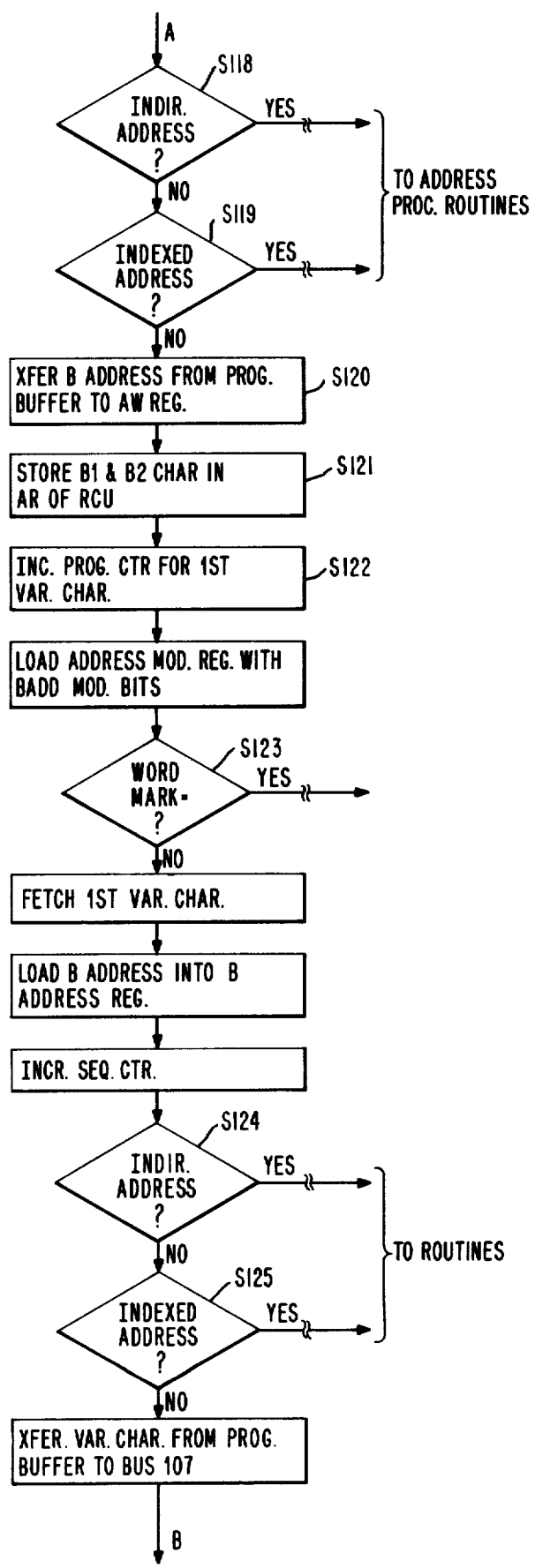
Fig. 4.(sheet 2 of 4)

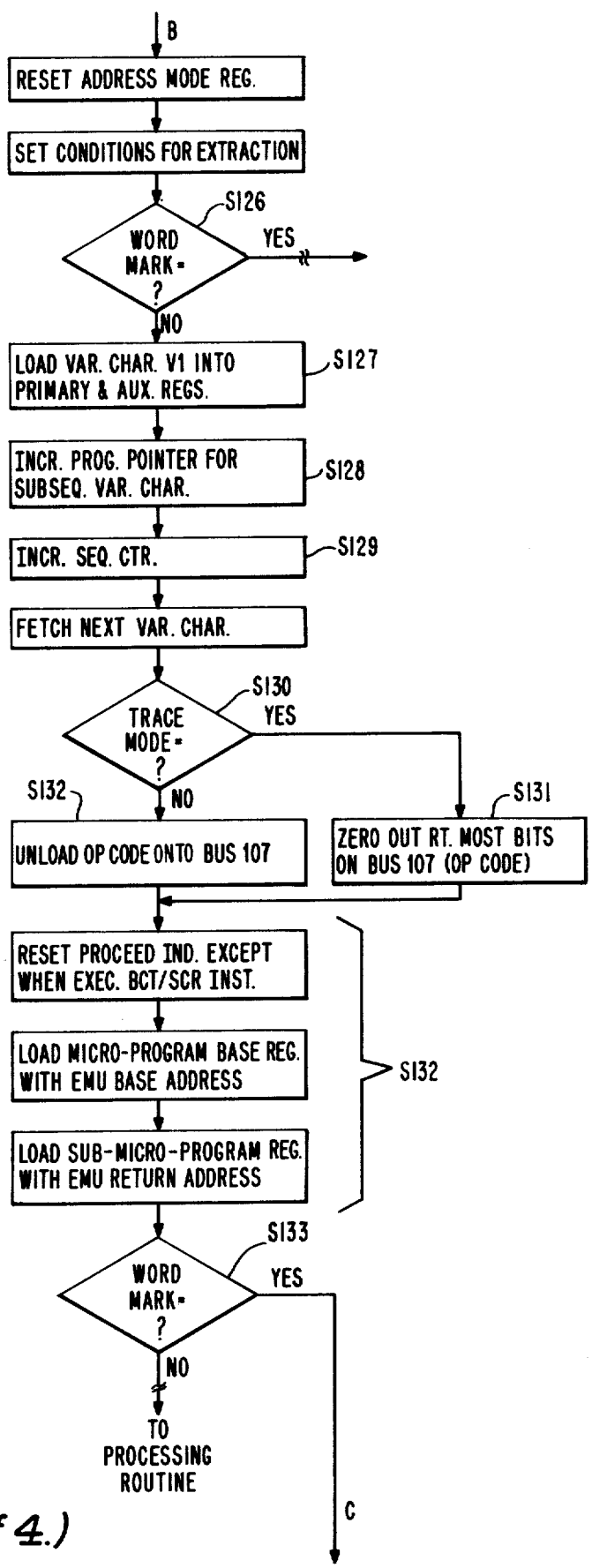
Fig. 4. (sheet 3 of 4.)

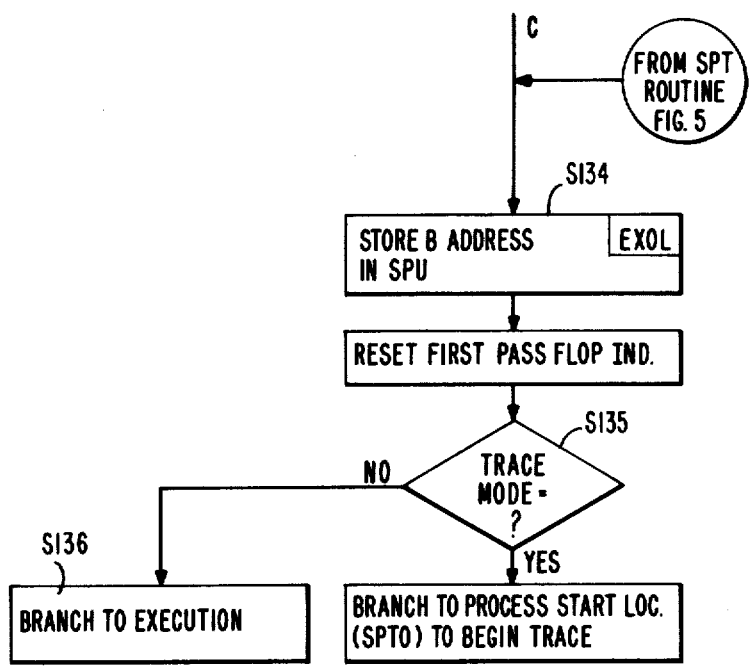
Fig. 4. (sheet 4 of 4)

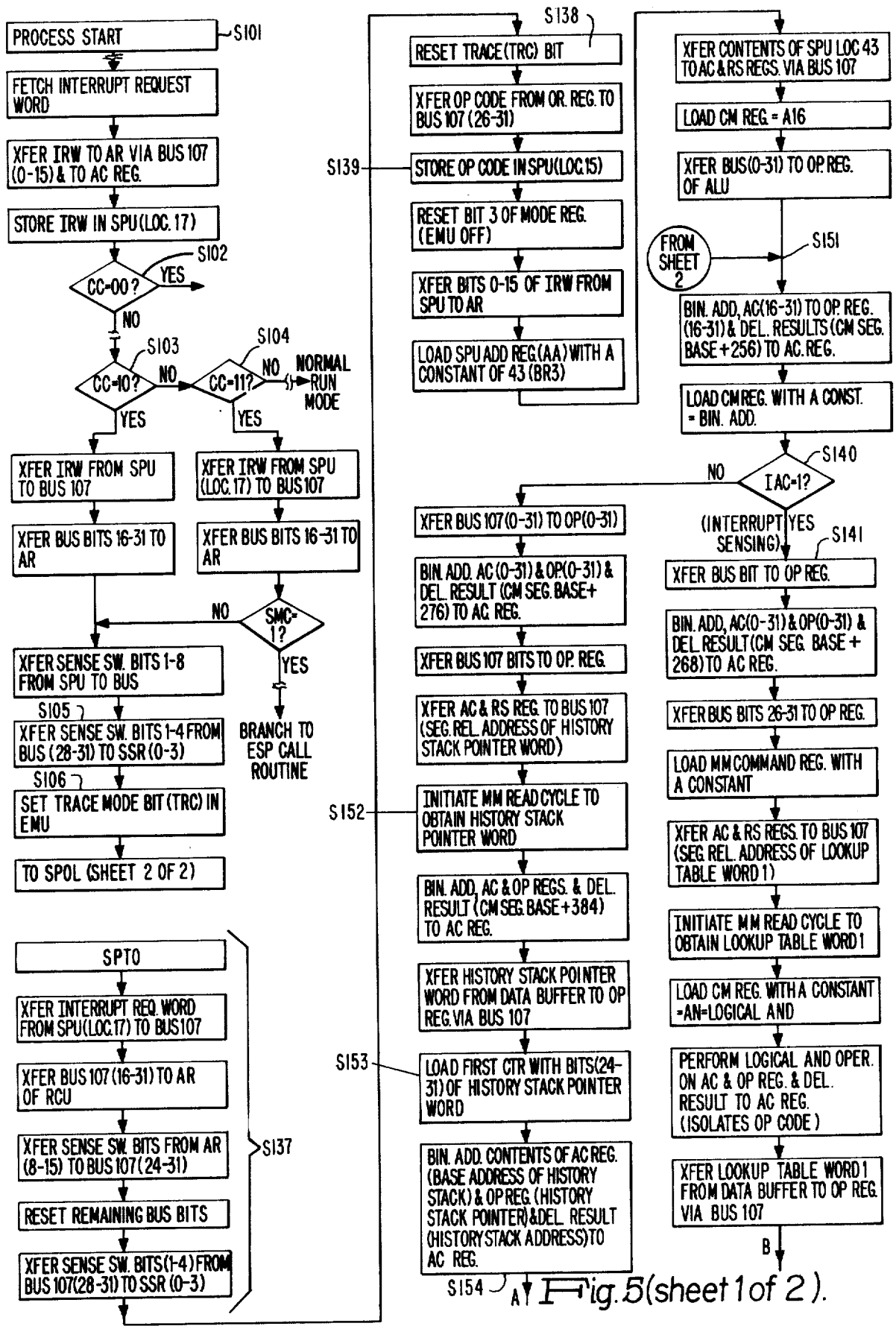
Fig. 5 (sheet 1 of 2).

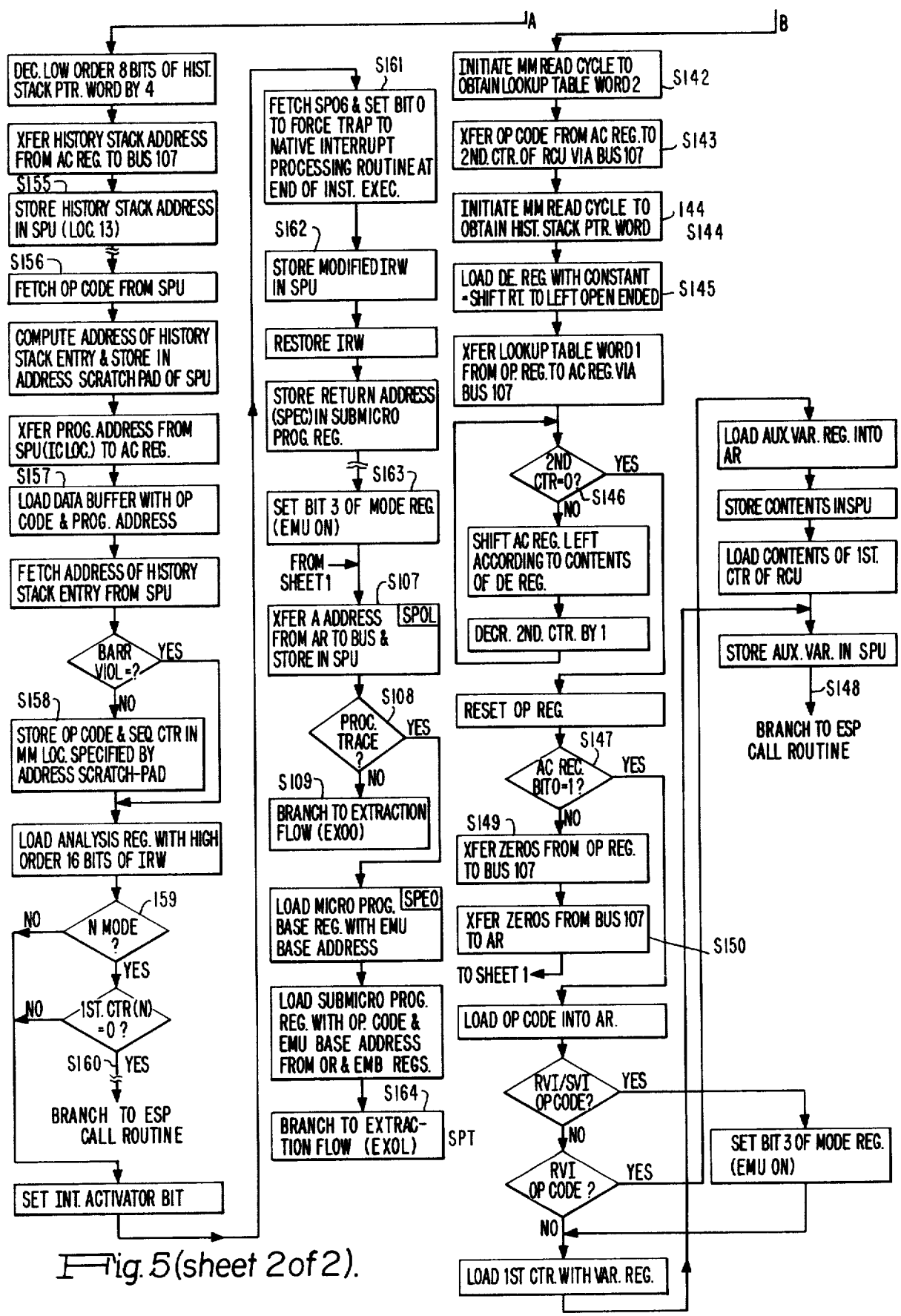
Fig. 5 (sheet 2 of 2).

TRACE METHOD AND APPARATUS FOR USE IN A DATA PROCESSING SYSTEM

REFERENCED APPLICATIONS

1. "Emulation Apparatus" invented by Allen C. Hirtle and David B. O'Keefe, filed on Apr. 14, 1975, bearing Ser. No. 567,981 and assigned to the same assignee as named herein, now U.S. Pat. No. 4,084,235 issued Apr. 11, 1978.

2. Data Processing System with a Microprogrammed Dispatcher for Working in Native or Non-Native Mode invented by Andre Milleret et al, filed on Dec. 2, 1974, bearing Ser. No. 528,824 and assigned to the same assignee as named herein, now U.S. Pat. No. 3,997,895 issued Dec. 14, 1976.

3. Method and Apparatus for Executing an Extended Decor Instruction invented by Marc Appell et al, filed on Dec. 2, 1974, bearing Ser. No. 529,257 and assigned to the same assignee as named herein, now U.S. Pat. No. 4,077,058 issued Feb. 28, 1978.

BACKGROUND OF THE INVENTION

1. Field of Use

This invention relates to digital computer systems and more particularly to a method and apparatus for efficiently tracing the flow of program instructions as they are being executed by a computer system.

2. Prior Art

It has been found that the use of a trace procedure facilitates diagnosis of failures within a data processing system. Generally, a trace provides a listing of the conditions of various registers, control and status indicators at predetermined times during the execution of the program, as for example, at the completion of execution of each instruction or after a predetermined number of cycles during the execution of a particular instruction.

Program traces have been implemented in a number of ways. One technique has employed simulation programs for interpreting the instructions of a program being traced and simulating the hardware of the data processing system. This technique is exceedingly slow and the more complex the system, the longer the tracing operation becomes.

Another technique involves inserting each of the instructions to be traced in a program so that each instruction is followed by a group of special instructions which are operative to record and print out the flow of the program. A further technique concerns the tracing of a computer program during selected program procedures. Each program procedure contains a number of different instructions which in sequence control the operation of the system. Each procedure has associated with it a program control word which is interrogated whenever there is an entry into the program procedure. At least one bit in the program control word is used to indicate whether or not the procedure is to operate in a trace mode in which the completion of each operation causes entry into an interrupt procedure for recording the flow of the program. It has been found that the techniques mentioned are time consuming and involve additional instructions. The last procedure mentioned is limited to tracing program instructions associated with different procedures.

Accordingly, it is a primary object of the present invention to provide an arrangement for efficiently tracing the flow of instructions within a program.

It is a specific object of the present invention to provide an arrangement for tracing the execution of program instructions processed by a system when operated in other than its natural mode of operation.

SUMMARY OF THE INVENTION

The above objects are achieved according to the arrangement of the present invention which provides for selective tracing of program instructions. In a preferred embodiment, the system includes an emulation unit for executing instructions of target system programs. At least one bit in an interrupt control word associated with the emulation unit indicates whether or not program instructions are to be executed in a trace mode. When operating in the trace mode, the system under microprogram control, at a predetermined point in the processing of each instruction (i.e. after determining the effective addresses of any operands specified) but before the emulation unit begins the execution of each instruction, references a location within a table using the instruction op code for determining whether or not the particular instruction is executable. In the particular embodiment, a binary ONE bit when placed in the table location referenced causes the system to "trap" the instruction to the system software. More specifically, the system under microprogram control generates a call to the system software without executing the instruction and without recording its op code in a history stack associated therewith. After the call has been processed by the system and the necessary information recorded or checked, the system conditions the emulation unit for execution of the instruction completing the processing thereof.

When the trap bit associated with the instruction op code is set to a binary ZERO, the system records the instruction op code together with other information (e.g. sequence counter) in one of the history stack locations and then conditions the emulation unit to continue the execution of the instruction.

Thus, the arrangement of the present invention provides a history record of the types of instructions being executed with little delay or degradation in system performance. This is achieved by being able to select the types of instructions to be traced. By providing for inclusion of additional information together with the op code of the instruction, this facilitates detection of reasons for the occurrence of improper execution of the same type of instruction at different points in time arising from the occurrence of external asynchronous events.

In the case of variable length systems, the arrangement of the present invention provides a convenient starting point at which an instruction is examined for tracing thereby facilitating detection of various discrepancies in instruction processing. That is, by examining an instruction after computing its operand addresses but before beginning its execution, the system can record the state of the system at that point including the starting addresses for the operands about to be manipulated. Additionally, for instructions which are trapped, the system can reference additional instructions included for simulating the execution of an instruction for determining which portion of the system is not operating properly.

The novel features which are believed to be characteristic of the present invention both as to its organization and method of operation, together with further objects and advantages thereof will be better understood from the following description when considered in connection with the accompanying drawings. It is to be expressly understood, however, that these drawings are for the purpose of illustration and description only and are not intended as a definition of the limits of the present invention.

BRIEF DESCRIPTION OF THE DRAWINGS

FIG. 1b shows the layout of the process control block (PCB) included in the main store of FIG. 1.

FIG. 1c shows the format of the interrupt request word of FIG. 1a.

FIG. 1d shows the format of the lookup table words of FIG. 1a.

FIG. 1e shows the format of a stack entry of FIG. 1a.

FIG. 1f shows the format of a history stack pointer word of FIG. 1a.

FIG. 2 illustrates the control word format of the microinstructions executed by the system of FIG. 1.

FIGS. 4 and 5 are microprogram flow charts used in explaining the principles of operation of the present invention.

GENERAL DESCRIPTION

Figure 1:
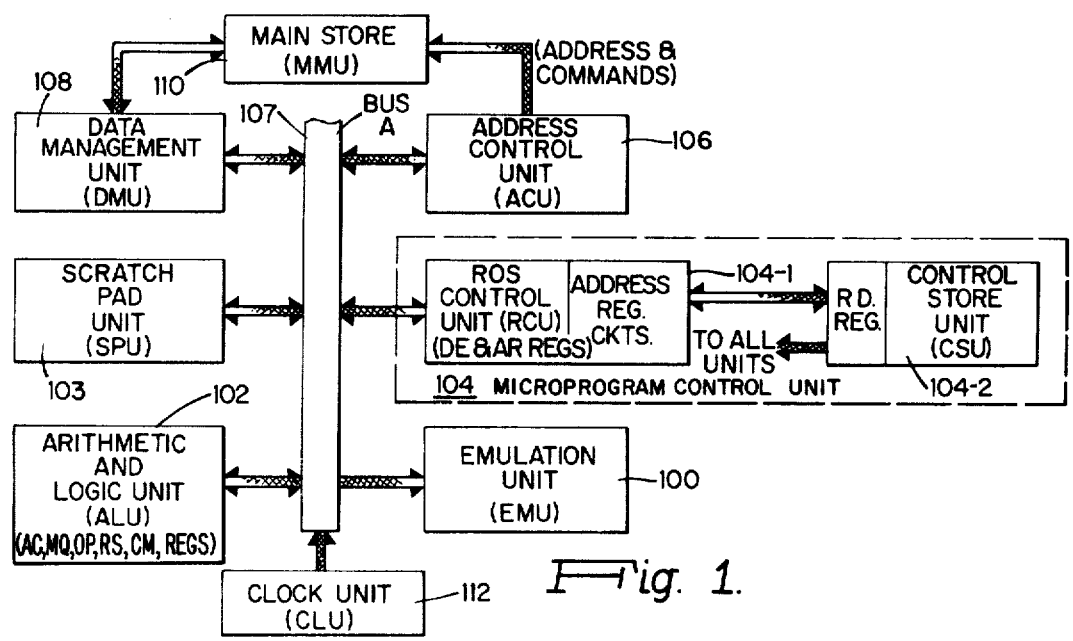
FIG. 1 is a block diagram illustrating a data processing system which utilizes the apparatus and method in accordance with the present invention.
Figure 1A:
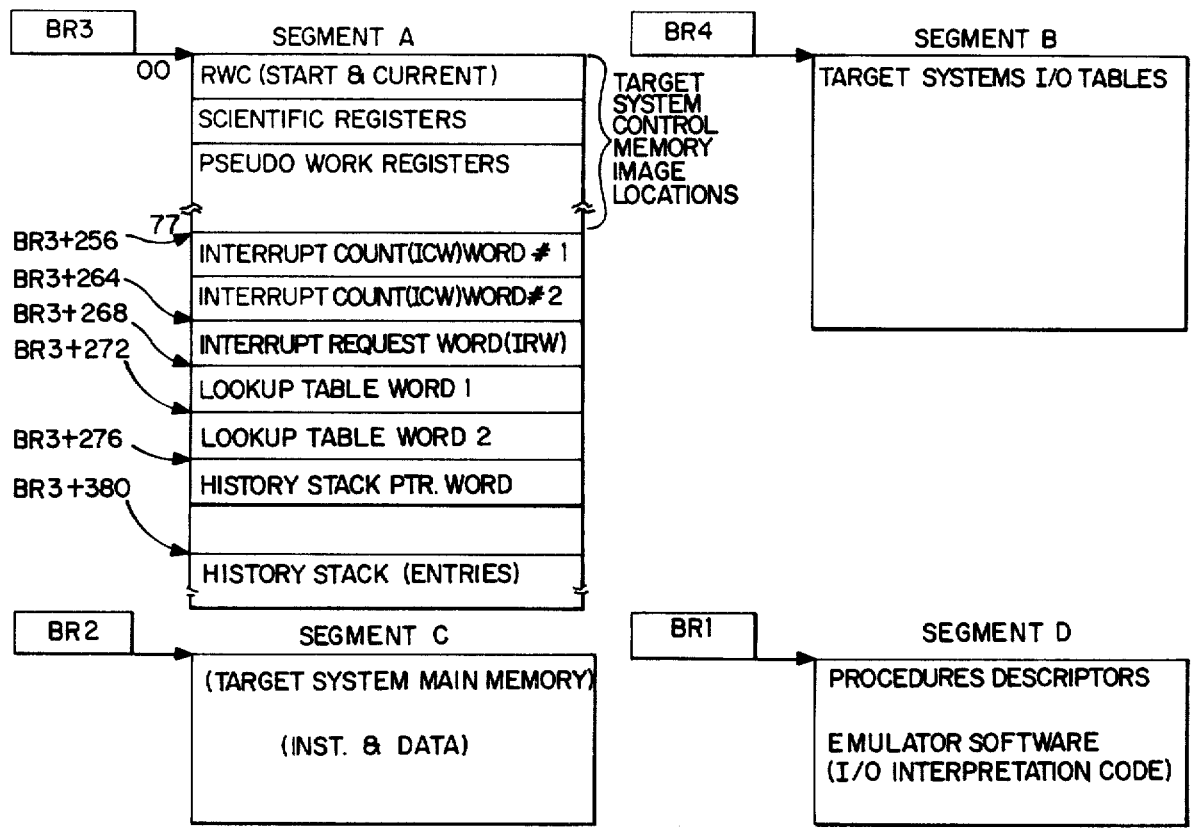
FIG. 1a is a memory map illustrating diagrammatically the layout of the main store in accordance with the present invention.
Figure 3:
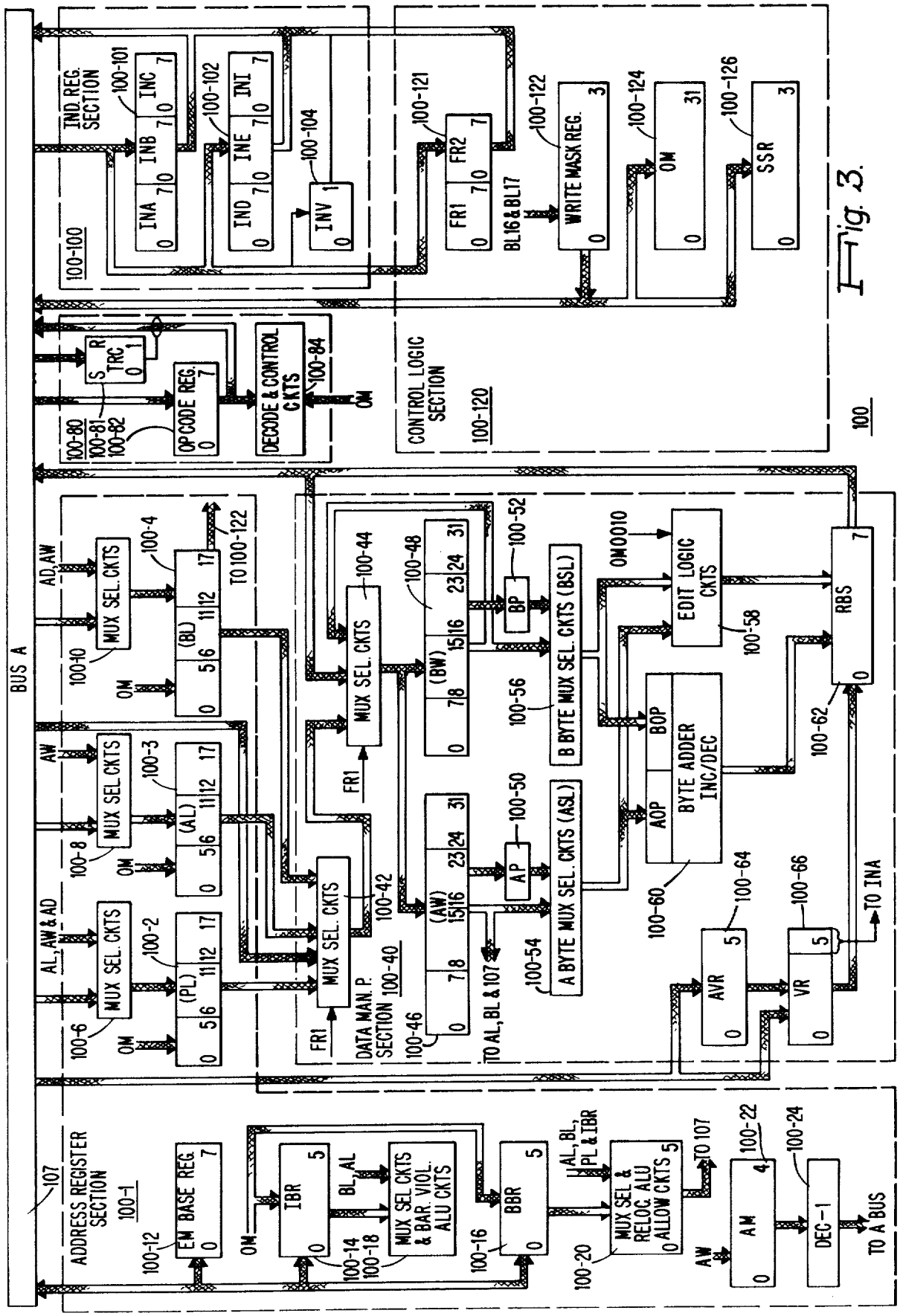
FIG. 3 illustrates in block form the emulation unit of FIG. 1.

Main Store 110—FIG. 1a

The main store 110 is divided into a plurality of segments which are accessible by a given process definable by the operating system software. The main store emulator and data structures as seen from FIG. 1a include a plurality of segments (A through D).

Segment A which is the most pertinent to the present invention, is coded to store an image of the target system control memory (e.g. read/write counters, etc. and is identified by the contents of base address register 3 (BR3)). Additionally, the segment stores a number of control words, a history stack pointer word and a history stack utilized by the present invention.

More specifically, the interrupt request work (IRW) is used to save interrupt requests and provides a means for communicating changes to the interrupt request states to the operating system software without suspending process operations. The format of the IRW is as shown in FIG. 1c. Referring to the Figure, it is seen that the word has 4 bytes, the first of which is pertinent to the present invention. This byte, designated INW, is coded as shown. Bits 1 and 2 define the different cycling modes of operation for the system when operating in emulation mode. A cycle code of 00 specifies normal operation in which instructions are extracted and executed normally. A cycle code of 01 specifies an instruct mode of operation wherein the system can enter a step mode of operation for stepping through instructions when a SMC bit is set to a binary ONE.

The next two cycle codes 01 and 11 are related to a trace mode of operation. A cycle code of 01 specifies a trace op code mode wherein when an interrupt actuator (IAC) bit is a binary ZERO every instruction executed is recorded in the history stack and the op code trap bits contained within a pair of lookup table words are ignored. This mode is utilized for resuming the trace operation following a call to the emulation software when the interrupt actuator (IAC) bit is a binary ONE.

When in the trace op code mode, and the interrupt actuator bit is a binary ONE, the system under microprogram control references the trace mode lookup table which includes the pair of lookup table words 1 and 2 of FIG. 1a. These two words are formatted as shown in FIG. 1d to contain trap bits for the op codes (00)$_8$ through (77)$_8$. When the respective op code trap bit is a "0", the system under microprogram control proceeds with execution and records the instruction in the history stack. When the op code trap bit is a "1", the system calls the emulator software without recording the instruction.

More specifically, in the non trace mode of operation, a number of op codes which are not included in the lookup table are never executable and produce an internal interrupt op code violation condition or a call to the ESP software. Another group of op codes are executed in a manner which depends upon the target system usage and protection constraints. Other op codes are executable only if certain options are present. For further information regarding such instructions, reference may be made to the copending application titled "Emulation Apparatus".

In the trace mode of operation, instructions which would not normally call the ESP software as part of their execution are tagged "for trace mode trapping" in the lookup table which produces a trace call. The nonexecutable op codes, as in the case of a non trace mode produce a call to the ESP software. The group of executable op codes cause the lookup table to be referenced before "execution" begins.

The history stack includes 32 words in the control memory segment. The stack is operated as a circular buffer push down stack with 32 word entries. Each entry has the format shown in FIG. 1e. The location of the position into which the next entry will be made is pointed to by the stack pointer which resides in the low order 7 bits of the history stack pointer word shown in FIG. 1f. The stack pointer is decremented after entry such that the most recently made entry is located in the next higher word address in the stack.

A cycle code of 11 (FIG. 1c) designates trace N mode operation which in addition to specifying the trace mode enables "N" number of instructions to be traced. The step mode call (SMC) bit must be a binary ZERO for each trace N mode operation.

Segment B of main store 110 (FIG. 1a) includes the input/output tables and is accessed by the contents of base address register 4 (BR4).

The target system main memory is allocated to segment C and is identified by the contents of base address register 2 (BR2). The segment size is arranged to be equal to the memory size of the target system being emulated.

Segment D includes the tables and routines for handling those functions not being carried out by the hardware or "firmware" of the system. For example, the ESP is operative to translate and execute target system input/output instructions. Also, it can simulate various hardware portions of the target system architectures or signal the native operating system to perform certain operations heretofore performed by the target systems or software associated therewith as explained herein.

Although not shown in FIG. 1a, there is a segment or portion of a segment in main store 110 which contains the process control block (PCB). As mentioned, the PCB is illustrated in FIG. 1b.

GENERAL DESCRIPTION OF PREFERRED EMBODIMENT—FIG. 1

Referring to FIG. 1, it is seen that the system of the present invention includes a main store 110 and a processor comprising a data management unit (DMU) 108, a scratch pad unit (SPU) 103, an arithmetic and logic unit (ALU) 102, an emulation unit (EMU) 100, a microprogram control unit 104 which comprises a ROS (read only store) control unit (RCU) 104-1, and a control store (CSU) 104-2, and address control unit (ACU) 106 and a clock unit (CLU) 112 which couple to a multiconductor bus 107 as shown. For the purpose in describing a preferred embodiment of the present invention, the units of primary concern correspond to EMU 100 and microprogram control unit 104. The remaining units as well as certain portions of the units mentioned may take the form of those units described in the referenced Related Applications as well as the units described in the copending application of Allen C. Hirtle titled "Table Driven Emulation System" bearing Ser. No. 430,322, filed Jan. 2, 1974, and which issued May 4, 1976, as U.S. Pat. No. 3,955,180 and is assigned to the assignee named herein.

Briefly, the ACU 106 provides absolute addresses for referencing main store 110. More specifically, the unit 106 includes apparatus which transforms segmented addresses into absolute addresses. It will be appreciated that these operations are performed under the control of the microprogram control unit 104. The data management unit 108 provides an interface between the processor subsystem and main store 110. The unit 108 includes circuits which specify which portion of the main store 110 has information to be retrieved during subsequent memory cycles and transfers the information into the registers at the appropriate time.

The SPU 103 provides temporary storage for information used frequently by the processor such as table pointers, base registers, general registers, operands and partial results stored during data manipulation operations. The ALU 102 constitutes the system's arithmetic and logic unit which is operative to execute binary, decimal, logical operations on a multibyte basis. Additionally, the ALU 102 includes circuits for computing segmented effective addresses during address preparation operations. As indicated in FIG. 1, the ALU 102 includes a plurality of registers designated, AC, CM, OP and RS which couple to bus 107. The AC and OP registers serve as operand registers for the arithmetic and logic unit. The MQ register is a shift register which provides a shifted result to the AC register. The CM and RS registers provide storage for control and address information, respectively, required during the performance of operations by ALU 102.

The clock unit 112 is operative to generate all the timing signals for the processing unit and microprogram control unit 104. The control store unit 104-2 of unit 104 stores micro-instructions which generate signals for controlling the system's operation in either an emulation mode or in the native mode of operation. The read only store unit 104-1 is arranged to provide the branching facilities and other circuits for generating addresses for read out of microinstructions from control store unit 104-2 and for controlling microprogram or "firmware" execution. The RCU 104-1 includes address register storage comprising an analysis register (AR) which couples to bus 107 and provides branch argument signals for microprogram sequencing. The unit 104-1 also includes a register (DE) which receives control signals from CSU 104-2 and provides shift control signals to the ALU 102 via bus 107. Additionally, RCU 104-1 includes a pair of counters for storing signals received from CSU 104-2 used during instruction tracing as explained herein.

The different units coupled to bus 107 are directed by the microprogrammed control unit 104 to perform certain operations. In the particular embodiment shown in FIG. 1, it is contemplated that the processor is arranged to provide emulation operation in an optional mode. Briefly, certain bits within the microinstruction words read out from the read only memory 104-2 applied to bus 107 determine whether the EMU 100 or the ALU 102 is operative for processing a particular program instruction.

The ALU 102 and EMU 100 are switched on and off depending upon the particular instructions to be processed. Each unit may concurrently utilize the facilities of the other units within the system during instruction processing. For further information regarding the switching of the EMU 100 and ALU 102, reference may be made to the related application of Andre Milleret et al.

MICROINSTRUCTION FORMAT—FIG. 2

The control store unit 104-2 stores groups of microinstructions linked together to perform directly executable target system instructions. These microinstructions are stored in 4K (4,096) of read only memory of unit 104-2. The location selected to start a sequence of microinstructions for executing a program instruction is determined by transferring a combination of the bits stored in certain registers within the emulation unit 100. These registers correspond to a base address register and op code register whose contents are transferred via bus 107 to the RCU 104-1.

The microinstructions stored in CSU 104-2 can be divided into five different groups or families. Each group is arranged to control or exercise a particular portion of the system of FIG. 1. To carry out a step within the target system instruction, this requires that a combination of the five groups of microinstructions work together. The group for controlling the emulation unit 100 corresponds to group 3. The microinstructions of this group condition the emulation apparatus to execute register to register transfers and to perform adding, incrementing, decrementing, etc. operations required for that instruction.

A typical format for these microinstructions is shown in FIG. 2. Referring to the figure, it is seen that each microinstruction word contains 32 bits, each divided into a number of groups. It is seen that bits 0 and 1 of the word are coded to define which one of the units of FIG. 1 is applying signals to bus 107. The next group of bits define microinstructions which are used by the ACU 106, the SPU 103 and DMU 108. Bits 8 through 12 define microinstructions which control operations within the EMU 100 or ALU 102. These microinstructions are as illustrated in the table of FIG. 2.

Bits 13 through 19 define microinstructions for controlling the operation of the ROS control unit 104-1 and control store unit 104-2. The next group of bits provides some checking not pertinent to the operation of the present invention. Bits 24 through 31 constitute an address field which may be combined with bits 20 through 23 to form either a long address or a particular constant or parameter.

DETAILED DESCRIPTION OF EMULATION UNIT—FIG. 3

The emulation unit 100 comprises an address register section 100-1, an op code register section 100-80, a data manipulation section 100-40, an indicator storage section 100-100, and a control logic section 100-120. As seen from the figure, bus 107 connects the emulator unit 100 with the processor such that any information used by the unit must be applied to bus 107 and any information to be transferred to the processor must be applied to bus 107.

The address register section 100-1 includes a program address register (PL) 100-2, an A address register (AL) 100-3, a B address register (BL) 100-4, an index barricade register (IBR) 100-14, a base relocation register (BBR) 100-16, an emulator base register (EB) 100-12 and an address modification register (AM) 100-24 arranged as shown. The program address register 100-2 contains 18 bits of storage received and corresponds to the "sequence counter" of the target system. The register 100-2 is loaded by any one of the sources indicated via the multiplexer selector circuits 100-6.

The A address register 100-3 is an 18 bit register which stores the address of the A operand field of a target system instruction. The B address register stores an 18 bit address specifying the location of mentioned B operand field of the target system instruction. Each of the registers mentioned can include circuits for incrementing or decrementing the address contents thereof and these registers and circuits couple to certain ones of the bit positions of option mask register 100-124 of section 100-120 as explained herein. Also, the registers are loaded from any one of the sources indicated which are selected by the multiplexer circuits 100-8 and 100-10.

The six bit index barricade register 100-14 identifies the location which defines the lower limit of a protected area of memory in the target system when the system is running under a storage protection feature. The six bit base relocation register 100-16 stores the base address of an area of memory into which a program can be relocated when the target system is not running in a relocation mode (the relocation mode allows the program to be run in a different area of memory than specified by its addresses). Each of the registers couple to the circuits of blocks 100-18 and 100-20 which receive input signals from the registers indicated. These circuits include comparison circuits, conventional in design, for detecting attempts to access non existent memory or unauthorized segments of memory.

The emulator base register 100-12 stores an 8 bit address of a starting sequence of microinstructions termed a page within CSU 104-2. The address modification register 100-22, coventional in design, stores a 5 bit address corresponding to the modifier bits of a 3 or 4 character mode address. The address can be decremented by circuits of block 100-24. During a multiplication operation, this register is also used to store carries.

DATA MANIPULATION SECTION 100-40

This section performs operand processing and includes a 32 bit A operand register (AW) 100-46, a 32 bit B operand register (BW) 100-48, an 8 bit variant character register (VR) 100-66 and an 8 bit auxiliary variant register (AVR) 100-64 only six bits of each variant register are used and each register is connected as shown. The A and B operand registers 100-46 and 100-48 receive operands from the sources shown via the series connected multiplexer selection circuits 100-42 and 100-44. The variant registers 100-64 and 100-66 store target system variant characters received from bus 107.

A pair of AP and BP pointer registers 100-50 and 100-52 initially receive signals from bit positions 16-17 of corresponding ones of the registers 100-46 and 100-48. Signals from these registers are used to select which one of the 4 bytes in registers 100-46 and 100-48 are transferred by corresponding ones of a pair of byte select logic circuits 100-54 and 100-56 to a byte adder 100-60 or to edit logic circuits of block 100-58. The byte adder 100-60 performs logic, binary and decimal operations upon the pair of operands applied to its A operand and B operand inputs. The results produced by adder 100-60 and edit logic circuits 100-58 are applied to a result byte spreader register 100-62. This register under microprogram control transfers a single byte result to either register 100-46 or register 100-48 via multiplexer circuits 100-44 as a function of the particular program instruction being executed.

The edit logic circuits of block 100-58 provide input signals to register 100-48 during the execution of an edit instruction and receive signals from option mask register 100-124 which condition the operation of such circuits. The edit logic circuits of block 100-58 may be considered conventional in design, and for further information, reference may be made to U.S. Pat. No. 4,084,235.

OP CODE REGISTER SECTION 100-80

The op code register section includes an op code register 100-82 connected to receive an 8 bit op code of a target system instruction. The op code signals from this register are applied to a number of decode and control circuits of block 100-84 operative to provide the necessary signals for controlling the operation of the emulation unit 100 under microprogram control. The circuits also receive conditioning signals from option mask register 100-124. Additionally, the op code is applied together with the contents of emulator base register 100-12 via bus 107 to the RCU 104-1 for selecting the correct microprogram sequence for executing a target program instruction. The transfer of op code signals is enabled selectively by a trace mode flip-flop 100-81. As explained herein, flip-flop 100-81 is set to a binary ONE when the system is conditioned to trace instructions in accordance with the present invention.

INDICATOR STORAGE SECTION 100-100

The indicator storage section includes a plurality of registers 100-101 through 100-104 coupled to bus 107 for storing information necessary for the emulation unit 100 instruction processing. A first 8 bit register of group 100-101 designated INA, stores information pertaining to character mode, compare indicator and decimal indicator information.

A second 8 bit register of group 100-101 designated INB, stores information pertaining to auxiliary target system indicators. A third 8 bit register of the group, designated INC, stores information pertaining to target system scientific indicators and sector masks.

The next 8 bit register of group 100-102 designated IND, stores information pertaining to target system storage protect features, relocation mode and instruction time out. The next two 8 bit registers of the group, designated INE and INI, store information pertaining to external interrupts and internal interrupts. The last register is a single bit register, designated INV, which stores information pertaining to a branch on condition test (BCT) trap mode of operation. Different ones of these registers also connect to receive signals from option mask register 100-124 which control the switching of various indicators.

CONTROL LOGIC SECTION 100-120

The control logic section stores status information and control information for establishing the environment in which the emulation unit 100 is processing target system program instructions. The section 100-120 includes a pair of 8 bit registers, designated FR1 and FR2, which store information pertaining to the status of the emulation unit 100. During instruction extraction, register FR1 stores information about which character is being extracted and error conditions. During instruction execution, it stores information pertaining to operand processing (e.g. recomplement operations, termination of A operand field).

Register FR2 stores information pertaining to extraction, execution, branch conditions, divide information, etc.

The remaining registers of section 100-120 include a 4 bit write mask register 100-122, option mask register 100-124 and a sense switch register 100-126. The write mask register 100-122 determines the number of characters to be transferred via bus 107 to the main store 110. The sense switch register 100-126 is a 4 bit register which stores the status of the sense switches of the target system being emulated. Lastly, the 32 bit option mask register 100-124 stores information pertaining to the options, features and characteristics of the target system being emulated.

OPTION MASK REGISTER

The option mask register (OM) is a 32 bit register which stores information pertaining to options and features included within the series of target systems being emulated. The register is loaded from general register GR9 of the SPU via bus 107 in response to a load option mask register (LOR) microinstruction during an initial entry sequence of microinstructions.

The output signals from the different bit positions of the OM register are applied to the different portions of the unit 100 for enabling the logic circuits included for executing target system instructions for different target systems models. The models and the instruction set are discussed in detail in the publication titled "Series 200 Programmer's Reference Manual (Models 200/4200)" Copyright 1971 by Honeywell Information Systems Inc., and designated by order number BA85, Rev. 0. For further details regarding the use of the option mask register, reference may be made to the copending patent application of Allen C. Hirtle and David B. O'Keefe titled "Emulation Apparatus" referenced above.

For the purpose of the present invention, the various registers, checking circuits, multiplexer circuits, ALU's, branching circuits discussed above can be considered conventional in design and may for example take the form of the circuits disclosed in the text titled "The Integrated Circuits Catalog for Design Engineers" published by Texas Instruments Incorporated, dated 1972. For example, the multiplexer selection circuits such as those of blocks 100-6 through 100-56 may take the form of circuit types SN54150 through SN74152.

DESCRIPTION OF OPERATION OF PREFERRED EMBODIMENT

With reference to FIGS. 1 through 5, the operation of the system of FIG. 1 employing the principles of the present invention will now be described with specific reference to the flow charts of FIGS. 4 and 5. By way of example, it is assumed that the system is going to process a target system instruction having the format F/A/B/V wherein F is an op code, A and B are variable operand address fields and V is a variant character.

The so-called compatibility feature including emulation unit 100 and microprogram routines associated therewith is assumed to have been activated in response to a native EXDE instruction which is explained in the aforementioned U.S. Pat. No. 4,077,058.

Before executing the instruction, various memory registers and tables must be initialized and the PCB must be conditioned to store the appropriate information for running a target system program (see FIGS. 1a and 1b). The group of locations of particular relevance to emulation unit 100 include general registers GRO through GR15 (FIG. 1b).

General register GR0 stores the INV, INA, INB and INC bytes. General register 4 (GR4) stores the IND byte while general register 9 (GR9) stores the compatibility feature control word (CFCW) which corresponds to the option mask word. General register 13 (GR13) stores the base relocation register and index barricade register information. The locations 148 through 176 provide storage for scientific accumulator information as indicated.

It is assumed that the system has executed an EXDE instruction which is coded to specify that the system is to run in the emulation mode. For the purposes of the present invention, the native EXDE instruction can be regarded as a conventional mode switching instruction. However, for further information concerning the EXDE instruction, reference may be made to U.S. Pat. No. 4,077,058.

Upon entering the emulation mode, the microprogrammed control unit 104 causes the CSU 104-2 to reference an initial entry routine. The initial microinstructions when executed cause the loading of the contents of the general register locations of the PCB into corresponding locations of the SPU 103 for immediate reference. Another group of microinstructions load the appropriate values for the base register locations of the SPU 103.

For the purpose of the present invention, the above operations can be viewed as housekeeping functions which are performed in a conventional manner. However, for additional information, reference may be made to the above mentioned copending patent applications to Marc Appell et al. and Allen C. Hirtle.

Continuing on with the description, during the initial entry routine, a sequence of microinstructions is executed which loads different ones of the registers of emulation unit 100. A TIB microinstruction when executed causes the index barricade register contents of SPU location GR13 to be loaded into the IBR register. During a following cycle, a TBR microinstruction loads the base relocation register contents of GR13 into BRR register 100-16 which was reset during a previous cycle of operation.

Another microinstruction causes the second word of variants and indicator registers IND, INE and INI to be loaded from one of the SPU locations via bus 107. During a next cycle of operation, a LOM microinstruction causes the option mask register 100-124 to be loaded from location GR9 of the SPU via bus 107. The SPU is conditioned to address location GR0 for read out of the first word of variants and indicators therefrom which are then loaded into registers INA, INB, INC and INV of FIG. 3 in response to a LVI microinstruction.

A LEB microinstruction when executed causes the microprogram base address to be transferred via bus 107 and loaded into the EM base register 100-12. Next, a LPL microinstruction loads the program register 100-2 via bus 107 from the SPU location GR2.

At the completion of this routine, the microprogram control unit 104 references a process start routine, a portion of which is shown beginning at step S101 in FIG. 5. The routine fetches the IRW, tests the condition code bits of FIG. 1c and branches to the sequences indicated in steps S102-S104 based on the condition code. Assuming trace mode (cc=10 or cc=11), the routine loads the sense register 100-126 (step S105), sets the trace mode (TRC) flip-flop 100-81 to a binary ONE (step S106) and begins extraction of the first target system program instruction from main store 110.

The extraction routine, identified as EX00, is entered through steps S107-S109 (FIG. 5, sheet 2) and begins with step S110 of FIG. 4, sheet 1. Branching step S108 tests the reset side of trace mode flip-flop 100-81 when determining whether to branch to the extraction routine. When the flip-flop is set, the trace function has not been performed and the program branches through "NO" to the extraction routine.

At the beginning of the extraction process, the starting address of the target system program stored in program register 100-2 is applied to bus 107, from there loaded into an RCU register and a main memory cycle is initiated to read the first word (4 bytes) of the program instruction into a program buffer register of the DMU 108. Another memory cycle is initiated (step S110a) following the incrementing of the starting address since the low order two address bits will not be ZERO.

The op code character and A address characters are transferred from the program buffer register of DMU 108 to bus 107. They are also stored in the SPU 103 in step S111. The high order two bits of the op code character are transferred from bus 107 to the op code register 100-82.

During a next cycle, step S112, a branch microinstruction tests for the presence of the item mark trapping mode bit signal.

Assuming no item mode trapping present, the character mode bits from the INA register are loaded into the analysis register of the RCU 104-1. The op code and AI character are also loaded into analysis register AR. The configuration of bits causes the CSU 104-2 to branch in steps S113 and S114 to the appropriate routine for processing the instruction having the format indicated and in the mode indicated. Next, the program pointer for the B address is incremented by 4 (step S115) and bit 1 of the FR1 register is set indicating extraction of the B operand. A next group of microinstructions set the conditions for extraction (e.g. set various bits within the analysis register for indicating the type of addressing, presence of errors, etc.).

Since there will be no word mark present at this time, a microinstruction is read out which increments by 5 the program address contents of the PL register 100-2 of FIG. 2. Another main memory cycle is initiated (step S116) to obtain the next 4 byte word of the instruction from main store 110. As seen from FIG. 4, step S117, the A address is loaded into the A operand register 100-3 (AL) from the AW register 100-46.

During the next cycles of operation, FIG. 4, sheet 2, microinstructions test for the type of addressing required. Assuming direct addressing ("NO" through both branching steps S118 and S119), the B address characters are transferred from the program buffer register of the DMU 108 of the AW register 100-46 (steps S120). Next, the first two characters of the B address are stored in the RCU analysis register and the program pointer is incremented by 4 to fetch the first variant character (steps S121 and S122). In a similar fashion, the various conditions are set for extraction and the analysis register is tested for a word mark at step S123.

Since there will be no word mark present, another main memory cycle is initiated to obtain the next word of the instruction (first variant character). The B address characters are then transferred from the AW register to the B operand register (BL). The contents of the P6 register are incremented by 4. The same tests are made for determining the type of B operand addressing (steps S124 and S125).

Assuming direct addressing, next the variant character from the program buffer is applied to bus 107 and another memory cycle is initiated. The variant character is then loaded into the AW and analysis registers and the conditions for extraction are set (FIG. 4, top of sheet 3). The analysis register AR at this time contains the first variant character and the op code of the next instruction in this example. The word mark test (S126) when performed on the V1 character causes the character to be loaded into the primary and auxiliary variant registers 100-64 and 100-66 (step S127).

Both the program pointer and program address are incremented by 1 (S128 and S129) and another memory cycle is initiated. Next, a microinstruction (S130) tests the state of the trace mode (TRC) flip-flop 100-81. This flip-flop was previously set in step S106 during the execution of the process start routine of FIG. 5 (i.e. decoded condition code of the IRW stored in SPU 103 which established that the system was to operate in the trace mode). It is seen from FIG. 4 that when the trace mode is indicated, the TRC flip-flop (set to a binary ONE) inhibits the op code register bits from being applied to bus 107 since in step S131 the rightmost bits on bus 107 are set to zero. Of course, where the IRC flip-flop 100-81 is a binary ZERO, the op code register bits are applied to bus 107 (S132).

During the next cycles (S132), the microprogram base register and submicroprogram registers are loaded with the emulation base address and return address in preparation for instruction execution. Next, the op code character in the analysis register is tested (S133) and the presence of a word mask causes the B address to be stored in SPU 103 (step S134, FIG. 4, sheet 4).

When the trace mode flip-flop 100-81 specifies a trace operation (S135), the CSU 104-2 branches to another portion of the process start routine (SPT0) of FIG. 5, sheet 1. When the trace mode flip-flop specifies no trace operation, the CSU 104-2 begins the execution of the instruction by entering step S136 as shown in FIG. 4, sheet 4.

Referring to FIG. 5, it is seen that in steps S137 the IRW is read-out from the SPU 103 for loading the sense switch indicator register. The same microinstruction (LSS) causes the trace mode flip-flop 100-81 to be switched from a binary ONE to a binary ZERO state (S138). This enables the op code register contents to be applied to bus 107.

Next, the op code contents are stored in the SPU 103 (step S139) and during subsequent cycles through step S140, the contents of base register 3 (BR3) are used to fetch the interrupt count word #1 to determine whether interrupt sensing is being provided. As mentioned, in the absence of interrupt sensing, every instruction executed is recorded in the history stack.

Assuming the presence of interrupt sensing (i.e., IAC=1 in S140), a sequence of microinstructions are executed (S141 through S142 of FIG. 5, sheet 2) which fetch lookup table words 1 and 2 from segment A of main store 110. Next (S143), the op code of the instruction is loaded into a second counter register of RCU 104-2 and the DE register is loaded (S145) with a constant for conditioning the operation of the ALU 102. During another cycle of operation (S144), another main memory cycle is initiated to obtain the history stack pointer word from segment A.

During the following cycles, as seen from FIG. 5, the lookup table word contents of the AC register are shifted left as the second counter contents are decremented by one until the second counter contents equal zero at S146. This signals that the op code trap bit resides in bit position 0 of the AC register. A next subsequent microinstruction (S147) tests the state of the bit and if it is a binary 1 the instruction is trapped, whereupon a call is generated to the ESP as shown in FIG. 5 at S148.

Assuming an op code trap bit of binary ZERO is sensed at S147, both the op register and AR registers are reset to ZEROS (S149 and S150) and the CSU 104-2 returns to a point in the main part of the routine at the entry point S151 (FIG. 5, sheet 1) to begin the execution of microinstructions for recording the instruction in the history stack area of segment A. It is seen from FIG. 5 that the address corresponding to the history stack pointer word is used to fetch the history stack pointer word from segment A at step S152. The first counter of RCU 104-1 is loaded with the pointer bits 24-31 at step S153. The ALU 102 during a next cycle of operation (S154) adds the history stack base address and pointer and the result address is stored in the SPU 103 (S155).

During a next cycle (S156), the main memory address is fetched from the SPU 103, a check is made and assuming no errors, the new stack pointer is stored in the stack pointer word location of segment A. Next, the op code and program address of the instruction is transferred (S157) to the DMU data buffer and assuming no barricade violation the entry is then stored (S158) in the history stack area of segment A at the address of the history stack.

As seen from FIG. 5, the IRW high order 16 bits are loaded into the analysis register of the RCU 104-1 for testing the condition code bits to determine whether tracing involves more than one instruction. If it does (N mode = YES at S159), the contents of the history stack pointer are examined to determine whether this is the last instruction to be traced. When the stack pointer contents equal zero, the routine branches to an ESP call routine at S160.

In the case where the system is either not operating in N mode or the pointer is not zero, the CSU 104-2 is operative to reference microinstructions which cause the setting of the IAC bit of the IRW and the writing of the IRW into the SPU 103 and into segment A (S162). Also, microinstructions fetch the contents of SPU location 6 and set bit 0 to a binary ONE (S161). This causes the generation of an interrupt to the system at the end of instruction execution which in turn causes a return to the process start routine which again conditions the system for tracing further instructions in accordance with the coding of the IRW. Also, the emulation unit 100 is enabled at step S163) and the A address is stored in the SPU 103 at step S107.

Sensing the completion of a trace operation at S108, the CSU 104-2 branches to the return address (SPEO) stored in the submicroprogram register of the RCU 104-1. Thereafter, the program branches from step S164 (STP) to EXOL (S134) shown in FIG. 4, sheet 4. When then TRC flip-flop is tested at S135, the microprogram branches to step S136 to execute the current instruction since the TRC flip-flop had been reset at S138 (FIG. 5, sheet 1), indicating that the trace function has been completed for the current instruction. If the system is calling for N-mode tracing (see S159, FIG. 5, sheet 2), the tracing of instructions continues until an event produces a call to ESP software (e.g. N=0) which can cause a change in the condition code bits stored in the interrupt request word.

From the foregoing, it is seen the arrangement of the present invention provides for the selective tracing of program instructions without any significant increase in the time for executing instructions. Moreover, the desirable results obtained by the present invention are achieved without the addition of program instructions.

It will be appreciated by those skilled in the art that many changes may be made to the present invention. For example, while the present invention was described in connection with tracing instructions processed by an emulation unit, the arrangement may also be used for tracing instructions of a system during its normal operation.

It will be obvious to those skilled in the art that many changes can be made to the illustrated embodiment without departing from the scope of the present invention.

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

What is claimed is:

1. A data processing system comprising:
processing means for processing instructions of a program, said processing means including storage means for storing signals for indicating when said processing means is to operate in a trace mode of operation;
a memory having a plurality of segments, one of said segments storing said instructions of said program, each instruction having an op code portion for defining the type of instruction and another one of said segments including a stack area and locations for storing a plurality of control words, at least one of said control words being coded to define types of executable instructions and another one of said control words being coded to define a plurality of modes of operations including said trace mode of operation for said processing means; and, microprogrammed control means for generating control signals required for processing said instructions, said microprogrammed control means being coupled to said processing means and to said memory, said control means including a plurality of sequences of microinstructions, said control means being operative in accordance with said another one of said control words in response to signals from said storage means indicating said trace mode of operation to reference one of said plurality of sequences for generating said control signals for referencing said one control word during a predetermined point in the processing of each instruction of said program fetched from said one segment, said control means in response to signals derived from said one control word being operative to reference selectively another sequence of said microinstructions for recording information indicative of each instruction in said stack area prior to execution of said each instruction by said processing means thereby providing a history of all instructions executed by said processing means during the running of said program.

2. The system of claim 1 wherein said predetermined mode is a trace mode and wherein said information indicative of said each instruction is coded to include the op code portion of each instruction designated as executable by said one control word.

3. The system of claim 2 wherein said one control word includes a plurality of bits, each bit being coded to indicate when a different predetermined one of said op codes is designated as executable.

4. The system of claim 3 wherein each said bit when coded to a binary ZERO designates an executable instruction and when coded to a binary ONE designates a non-executable instruction.

5. The system of claim 4 wherein said control means is operative in response to a binary ONE bit to reference a sequence of microinstructions for trapping said non-executable instruction to said system without recording said information indicative of said instruction.

6. The system of claim 2 wherein said instructions are coded to have a format including at least one operand address portion and wherein said predetermined point in said processing corresponds to a point following the generation by said processing means of an effective operand address before execution of the operation specified by the op code of said each instruction.

7. The system of claim 2 wherein each of said instructions is coded to have a format including first and second operand addresses and a number of control variant characters and wherein said predetermined point in said processing corresponds to a point following the generation by said processing means of effective operand addresses of said first and second operands and the fetching of said number of control variant characters before said execution of said operation specified by the op code of said each instruction.

8. The system of claim 2 wherein each of said instructions further includes a number of other portions coded for specifying information required for performing the operation specified by said op code portion, and wherein said predetermined point in said processing corresponds to a point when said processing means has completed the processing of said specified information as required before being conditioned by said control means to start said execution of said operation specified by the op code of each instruction.

9. The system of claim 2 wherein said processing means includes a program address counter for storing the address of said ech instruction fetched from said one segment and wherein said information is coded to further include the address contents of said program counter.

10. The system of claim 3 wherein said processing means is conditioned by signals generated by said microprogrammed control means to select for testing a predetermined one of said bits defined by the value of said op code portion of said each instruction.

11. The system of claim 1 wherein said predetermined mode is an N trace mode and wherein said microprogrammed control means includes means for storing a count having a value N designating a number of instructions to be traced, said control means being operative in response to signals indicating when said count has not decremented to zero to reference said another one of said sequences for generating signals for recording said information relating to said each instruction designated as executable by said one control word and for decrementing said count by one.

12. The system of claim 11 wherein said microprogrammed control means in response to signals indicative of said count being decremented to zero is operative to discontinue processing of said instructions and to reference a further sequence of microinstructions for generating a call request signal to said system.

13. The system of claim 1 wherein said stack area includes a predetermined number of addressable word locations for storing a corresponding number of instruction entries and wherein another one of said control words includes a stack point word for designating the address location of a next instruction entry to be stored, said microprogrammed control means being operative to generate signals in response to microinstructions of said another sequence to decrementing by one said stack pointer word after recording of said information of each instruction entry so that the most recent instruction entry is stored in the location having the next higher word address in said stack area.

14. The system of claim 1 wherein said processing means includes emulation means coupled to receive instructions of said program and wherein said plurality of sequences of microinstructions include sequences for conditioning said processing means to operate in native and emulation modes, said microprogrammed control means being operative to reference said one of said sequences each time said processing means switches from said native mode to said emulation mode to generate signals for referencing said another control word for selectively conditioning said storage means to cause said emulation means to operate in said predetermined mode during the processing of said instructions of said program.

15. A data processing system including:
a memory for storing instructions of a program;
processing means for processing instructions received from said memory;
microprogrammed control means coupled to said memory and to said processing means, said control means including a plurality of sequences of microinstructions for generating signals for conditioning said system for processing instructions; and,
means for recording indications of said instructions during the execution of said program, said means for recording comprising:

mode indicator storage included in said processing means;

a stack pointer included in said memory for providing addresses of successive locations in a stack area of said memory;

a control word included in said memory coded for defining any one of a plurality of modes including a trace mode of operation for said processing means;

a table in said memory coded to contain signals which designate all of the types of executable instructions includable in said program; and, said microprogrammed control means being initially conditioned to reference a predetermined one of said sequences for switching said mode indicator storage means to a predetermined state in response to said control word when coded for defining a trace mode of operation for said system and said mode indicator storage conditioning said microprogrammed control means when in said predetermined state to reference another one of said sequences for generating signals for accessing said signals of said table during a predetermined point in the processing of each instruction, said control means being conditioned by coded signals from said table to store signal indications of only those instructions designated by said coded signals as being executable into the location specified by said stack pointer for accumulating a history of all of the instructions executed by said processing means during the running of said program.

16. The system of claim 15 wherein each said instruction is coded to include an op code portion, said system further including means for storing the program addresses of said instructions and wherein said signal indications include the op code portion and the program address of said each instruction designated as executable by said coded signals.

17. The system of claim 15 wherein each instruction is coded to include an op code and wherein said table includes a plurality of control words, each having a predetermined number of bits, each bit being coded to indicate when a different predetermined one of said op codes is designated as executable.

18. The system of claim 15 wherein each of said instructions has a format including an op code and a number of operand addresses and wherein said predetermined point in said processing of said instruction corresponds to a point following the generation by said processing means of the effective operand addresses before the execution of the operation specified by the op code of said instruction.

19. The system of claim 15 wherein said processing means includes emulation means coupled to receive the instructions of said program and wherein said plurality of sequences are coded to contain microinstructions for conditioning said emulation means to operate in native and in emulation modes, said microprogrammed control means being operative each time said processing means switches from said native mode to said emulation mode to reference said predetermined one of said sequences for selectively conditioning said emulation means to operate in said trace mode during the processing of said instructions of said program.

20. A data processing system comprising:

a memory having a plurality of segments, one of said segments for storing instructions of a target system program, each instruction including an op code, another one of said segments including a stack area and storing a plurality of control words or defining the operational state of a process to be run by said system, one of said plurality of control words corresponding to an interrupt control word coded to define different cycling modes of operation for said system, at least one of said cycling modes corresponding to a trace mode of operation, other words coded to define types of executable instructions;

processing means for processing said instructions and including means for receiving and storing signals representative of said instructions and said processing means including a bi-stable trace mode indicator; and, microprogrammed control means for generating control signals required for processing said instructions coupled to said processing means and to said memory, said control means including a plurality of sequences of microinstructions, different ones of said sequences for controlling said processing means to operate in native and emulation modes of operation, said control means being operative each time said processing means switches from said native to said emulation mode to reference a predetermined one of said sequences for generating signals to reference said interrupt control word and said microprogrammed control means being conditioned by said interrupt control word when coded to specify said trace mode to switch said trace mode indicator means to a first state, said mode indicator means conditioning said control means to reference another one of said sequences for generating signals to access said other control words during a predetermined point in the processing of said each instruction received by said processing means for selectively recording information indicative of each type of instruction in said stack area for providing a history of the types of instructions executed during the running of said process.

21. The system of claim 20 wherein one of said plurality of control words corresponds to a program sequence address word which is modified for designating the program address for each one of said instructions and wherein said information indicative of said instruction includes said op code and said program address corresponding to said program sequence address word.

22. The system of claim 21 wherein each of said number of control words includes a plurality of bits, each bit being coded to indicate when a different predetermined one of said op codes is designated as executable.

23. A method of facilitating the tracing of instructions of a program stored in a memory during the processing of said instructions by a data processing system, said method comprising the steps of:

storing initially in said memory, a control word including a condition code coded for defining different cycling modes of operation for said data processing system, one of said modes corresponding to a trace mode;

storing initially in said memory, a table including information coded for indicating the types of instructions designated as executable by said system;

conditioning said system when set to operate in said trace mode for referencing said table at a predetermined point in the processing of each of said instructions read out from said memory by said processing system prior to the execution thereof; and, said processing system selectively storing in a stack area of said memory coded signal indications of each said instruction in accordance with said coded information stored in said table for providing a history of all instructions executed by said system during the running of said program.

* * * * *